(12) United States Patent
Hedrick et al.

(10) Patent No.: US 7,589,735 B2
(45) Date of Patent: *Sep. 15, 2009

(54) AIRCRAFT FLAT PANEL DISPLAY SYSTEM WITH GRAPHICAL IMAGE INTEGRITY

(75) Inventors: Geoffrey S. M. Hedrick, Malvern, PA (US); Shahram Askarpour, Media, PA (US); Markus Knopf, Ambler, PA (US); Jeff Collins, King of Prussia, PA (US)

(73) Assignee: Innovative Solutions & Support (ISS), Exton, PA (US)

( * ) Notice: Subject to any disclaimer, the term of this patent is extended or adjusted under 35 U.S.C. 154(b) by 450 days.

This patent is subject to a terminal disclaimer.

(21) Appl. No.: 11/212,059

(22) Filed: Aug. 24, 2005

(65) Prior Publication Data

US 2007/0046670 A1    Mar. 1, 2007

(51) Int. Cl.
- G06F 15/00 (2006.01)
- G06T 1/00 (2006.01)
- G06T 11/20 (2006.01)
- G09G 5/02 (2006.01)
- G06K 9/64 (2006.01)

(52) U.S. Cl. .................. 345/501; 345/440; 345/589; 382/278

(58) Field of Classification Search .......... 345/440, 345/501, 589; 382/278, 286; 25/440, 501, 25/589

See application file for complete search history.

(56) References Cited

U.S. PATENT DOCUMENTS

| | | | |
|---|---|---|---|
| 5,541,863 A | 7/1996 | Magor et al. | |
| 6,071,316 A | 6/2000 | Goossen et al. | |
| 6,232,932 B1 | 5/2001 | Thorner | |
| 6,311,327 B1 | 10/2001 | O'Brien | |
| 6,401,013 B1 | 6/2002 | McElreath | |
| 6,693,558 B2 | 2/2004 | Hedrick | |
| 2002/0149598 A1* | 10/2002 | Greier et al. | 345/589 |
| 2003/0223614 A1* | 12/2003 | Robins et al. | 382/100 |
| 2005/0057440 A1* | 3/2005 | Naimer et al. | 345/8 |
| 2005/0276514 A1* | 12/2005 | Fisher | 382/286 |

* cited by examiner

Primary Examiner—Xiao M Wu
Assistant Examiner—Aaron M Guertin
(74) Attorney, Agent, or Firm—Bryan Cave LLP

(57) ABSTRACT

An improvement over prior art aircraft instrument flight display systems for imaging on a bit-mapped display formed of a multiplicity of individually addressable pixels at locations throughout the display and actuatable to create images on the display, employs a common processor operatively connected between a video graphics processor and the display system input of a common set of aircraft and environmental sensor data— to provide both an integrity checking function and a graphics rendering function in which the integrity checking function can directly check the images generated by the graphics rendering function without the need for comparator hardware. Separate processors may also be employed instead of a common processor. The integrity checking function uses the input information for generating a pixel verification map for checking the display based on pixel color and location. The system can also check for pitch and roll accuracy as well as check the integrity of complex images using statistical detection.

32 Claims, 10 Drawing Sheets

RENDERING COMPUTER

VIDEO COMPARATOR ARRAY

System using a Software Comparator

System using a Hardware Comparator

ADI Background with Watermarks ized to useable formats, and the commands to create various informational alphanumeric and graphical images for reporting the relevant data on a display screen viewable by the flight crew are executed using the scaled parameters; these commands include graphical primitives such as points and lines, pointer, arc, polygon and fill commands, and alphanumeric characters. A typical display is produced by thousands of such commands that are executed on the order of 100 times every second. Each of these generated graphical primitives or primitive command elements must then be rotated, translated and their color (e.g., red, blue, green) modified or changed or varied in response to the data signal values received by the Symbol Generator. The creation, orienting and positioning of these graphical features for imaging on a screen display require thousands, and commonly tens or hundreds of thousands of lines of computer code. Once oriented and positioned, each primitive element is then rendered by calculating individual display field textels (points) and placing them into an 8 million byte pixel map in the video RAM, which is refreshed on the order of 100 times per second. The data fed to the graphical display screen must also be anti-aliased to smooth the generated image lines and thereby present to the flight crew a display that is both easy to read and interpret and which rapidly conveys the information that it is intended to represent. Anti-aliasing of display data, however, is extremely computationally intensive—typically 800 billion instructions/second—since it is necessary to compute the locus of points along each line, arc, etc. and the intensity levels of the adjacent pixels (i.e. those pixels adjacent to the computed data points) for smoothing of the graphical lines and images to be displayed. To avoid this high computational overhead many such displays use principally-vertical scales which do not require anti-aliasing of the image lines but which limit the ability of graphically-generated flight instruments to either graphically-depict (i.e. mimic) the conventional mechanical instruments with which the flight crew is familiar or present the flight instrument data in other convenient, legible, easily-utilized and readily understandable formats.

AIRCRAFT FLAT PANEL DISPLAY SYSTEM WITH GRAPHICAL IMAGE INTEGRITY

This application is related to commonly owned U.S. Pat. No. 6,693,558, filed Dec. 14, 2001, issued Feb. 17, 2004, naming Geoffrey S. M. Hedrick as the sole inventor, and is an improvement thereon. The contents of U.S. Pat. No. 6,693,558 are hereby specifically incorporated by reference in their entirety.

BACKGROUND OF THE INVENTION

1. Field of the Invention

The present invention relates to flat panel flight instrument displays for use in aircraft.

2. Description of the Related Art

It is essential in the creation of graphical flight instruments for an aircraft that are to be used and relied upon by the flight crew that they be of ultra high reliability and integrity.

In prior art systems, the Pilot Flight Display (PFD), Navigation Display (ND) and Engine/Electrical Display (ICAS) systems of an aircraft receive sensor data/inputs on all relevant parameters—about 100 pieces of data, the majority in the standard ARINC 429 serial format. This data is input to an image rendering Symbol Generator and is checked for reasonableness and validity. The parameters are then appropri- As noted in commonly owned U.S. Pat. No. 6,693,558, which overcomes many of the problems associated with the prior art, the rapidly evolving computer processing and graphics display generation technology from the PC industry provides low cost and exceptionally powerful computing engines, both in CPU's like the Intel Pentium 4 and in special purpose 256-bit parallel rendering engines and the like commercially available from a multiplicity of companies. The availability of increasingly more powerful computing engines facilitates the implementation of ever more capable and complex display systems, since these new systems are capable of executing many more instructions (i.e. lines of code) per second. However, the size of this code and the complexity of the displays, especially in these new large formats, raises in the avionics industry the problem of having to test all code intended for use on an aircraft to the exacting standards required by the FAA(Federal Aviation Administration) for flight critical airborne equipment in order to certify the new and improved processor and display subsystems for permitted use on aircraft. The hundreds of thousands of instructions that are executed by such equipment to format and display the critical flight data are required by the FAA to undergo exhaustive, carefully-documented testing that commonly takes 5000 man-months for even relatively modest changes to previously-certified systems. Moreover, the low-cost, high performance hardware that is widely available to the public from the PC industry cannot currently be used in conventional aircraft instrumentation systems because the design history and verification data for such hardware is not available from the manufacturer, and sufficient support data and testing has not been or will not be done by the manufacturer to demonstrate its operational reliability and design integrity.

Many of the prior art aircraft instrumentation displays use typically dedicated processors and graphics rendering chips that have been specifically designed for the particular application. FAA certification is based on a determination that both the hardware and the software of the display system have been thoroughly demonstrated, e.g. through extensive testing and documentation, to be operable in the intended aircraft flight deck environment and with the anticipated flight and environmental data without introducing unexpected errors or inaccuracies. This generally requires that the history or heritage of the processor or chip design must be fully documented to the FAA and that the hardware and software must be tested by validating data flow through every pathway in the chip using the entire range of data—i.e. every single value—that the chip would be expected to handle during normal use on the aircraft. This process requires many, many months of testing. As a result, a manufacturer that wishes to periodically improve, for example, the graphics processor of an aircraft image rendering computer would spend virtually all of its time testing the new or improved chips. Despite the fact that current, widely-available, relatively inexpensive, off-the-shelf graphics processor chips are improved and become significantly more powerful and capable every 6 months or so, the specialty aircraft instrumentation processor chips and software used in these specialized aircraft displays are for practical reasons very infrequently updated or changed to thereby avoid the constant re-testing for re-certification that the FAA would require to adequately demonstrate the validity and integrity of the display data that they output.

Accordingly, there always exists a need for an improved graphics display system for use in an aircraft and which can accommodate readily-upgradeable graphics display components and subsystems without adversely affecting existing FAA certification or requiring extensive recertification of the instrumentation display system. Many of these problems have been satisfied by the system disclosed in the referenced commonly owned U.S. Pat. No. 6,693,558 (hereinafter "the '558 system"), in which a comparator processor is used in conjunction with a graphics rendering computer processor. The graphics rendering processor—from which the display presented to the flight crew is generated—is operative for generating, from data provided by a bank of sensors and other environmental and operating parameters and aircraft inputs, the various commands needed for rendering anti-aliased graphically-presented data images on a display screen. A separate comparator processor is provided for independently calculating a selected plurality of data point display locations and values from the same sensors and input data from which the rendering processor generates the images that are to be displayed to the flight crew. The comparator processor then compares its calculated select data point values and locations to be the corresponding data points that have been generated for display by the graphics rendering processor to determine whether such values and locations are the same and thereby test the reliability of the rendering processor generated graphical image for display. Since the comparator processor output data is intentionally insufficient for providing a complete rendered screen display but, rather, is utilized only as an integrity check on the data produced by the graphics rendering computer, no anti-aliasing functionality is required of the comparator processor. This, coupled with the preferred and intended operation of the comparator in the '558 system to calculate only a limited number of select data points used in the comparison, permits the use of a notably simplified comparator processor that requires far less processing power and fewer executable commands to provide its data processing and comparison functions than does the graphics rendering processor by which the image for display is generated. As a result, expeditious FAA certification of the comparator is attainable. The use of a comparator processor as a check on the integrity of the graphics rendering processor data also permits the ready substitution of upgraded rendering engine graphics processors as such components and systems become available without extensive, if any, subsequent testing and documentation to obtain FAA recertification since the associated comparator processor will generally remain unchanged. However, the '558 system requires separate integrity checking and graphics rendering processors as well as requiring comparator hardware.

Accordingly, there still exists a need for improvements in such systems as well as improved techniques for checking the integrity of complex images in such systems.

SUMMARY OF THE INVENTION

An improved aircraft instrument flight display systems for imaging on a bit-mapped display formed of a multiplicity of individually addressable pixels at locations throughout the display and actuatable to create images on the display, employs a common processor operatively connected between a video graphics processor and the display system input of a common set of aircraft and environmental sensor data—to provide both an integrity checking function and a graphics rendering function in which the integrity checking function can directly check the images generated by the graphics rendering function without the need for comparator hardware. The integrity checking function uses the input information for generating a pixel verification map for the display which comprises at least one check pixel. Assuming the display is a normal color display, the check pixel is identified by an X and Y, location on the display and a color associated with the check pixel. The video graphics processor in the present invention includes a video memory, with the integrity checking function comparing the check pixel against information rendered by the video graphics processor in the video memory using the pixel verification map. The check pixel color helps verify that information in the display has been drawn to a correct location.

In the improved system of the present invention, the background color of the display may be different from the color of any objects displayed in the display, with objects including a watermark having a color close to the background color which is virtually identical to that color to the human eye. The integrity checking function in the system of the present invention, in such an instance, can detect a difference in color between the watermark and the background even through the human eye would not.

In order to check for pitch and roll accuracy in the system of the present invention, the background is an ADI background having a unique pattern thereon as the object, with this unique pattern being utilized for checking pitch and roll accuracy.

In the present invention, the display normally comprises a plurality of successive frames, with the pixel verification map comprising at least one check pixel in each of the successive frames. The integrity checking function checks a different point of the displayable image on the display until all of the points on the displayable image are checked. The integrity checking function utilizes statistical detection of a complex image in the display to check the integrity of the complex image, such as by selecting a sufficient number of points of light in the display to assure a high probability of detecting misleading images with a low probability of a false alarm. For example, if the complex image comprises an array of 1024 by 768 pixels, with each pixel comprising three sub-pixels, red, blue and green, the display may be refreshed once every 50 milliseconds with a data stream comprising 4096 combinations of color and intensity. Under such circumstances, the probability of one point of light appearing to be correct by random is one in every 4096.

If desired, a hardware comparator can also be utilized with the present invention to compare a subset of image pixels articulated by the integrity checking function against the video image for reporting any mismatches to the integrity checking function, as opposed to the software comparator type of operation described above. Moreover, with the software comparator type of operation, if desired, separate integrity checking and graphics rendering processors may be utilized in the place of a common processor, such as for enabling statistical detection of complex images in the display.

BRIEF DESCRIPTION OF THE DRAWINGS

In the drawings, wherein like reference characters denote similar elements throughout the several views:

FIGS. 1-6 are from U.S. Pat. No. 6,693,558 wherein:

FIG. 1 is a block representation of a pair of flat panel graphics displays forming a dual aircraft cockpit display system;

FIG. 2 is a block diagram of the symbol generator architecture for the system of FIG. 1;

FIG. 3 is a block diagram of the input/output (I/O) processor of the system of FIG. 2;

FIG. 4 is a block diagram of the graphics rendering computer of the system of FIG. 2;

FIG. 5 is a block diagram of the comparator processor of the system of FIG. 2; and FIG. 6 is a block diagram of the video comparator array of the comparator processor of FIG. 5;

DETAILED DESCRIPTION OF THE CURRENTLY PREFERRED EMBODIMENT(S)

Figure 1:
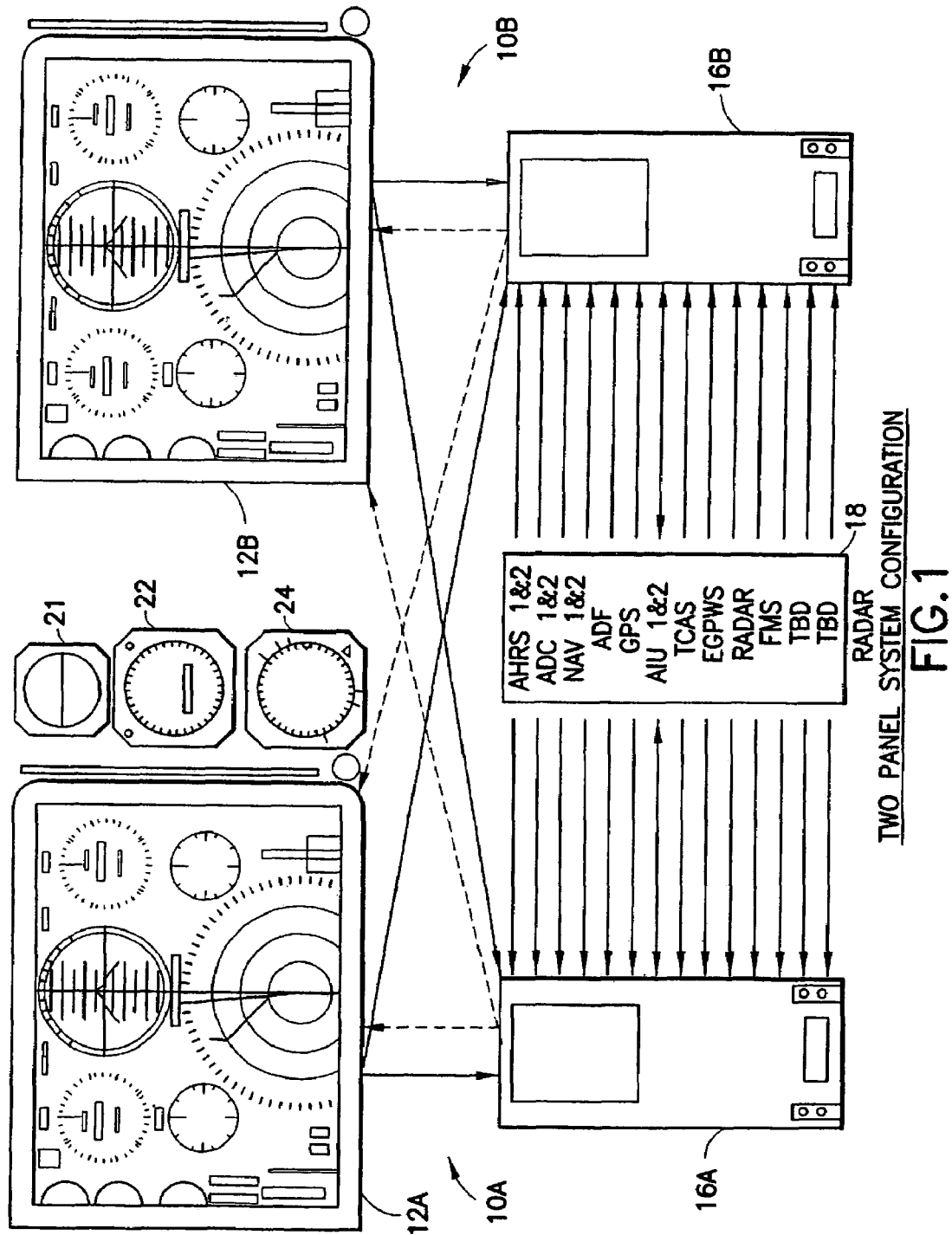

FIG. 1 depicts an implementation of an aircraft flight panel dual display system constructed in accordance with the system of U.S. Pat. No. 6,693,558 ("the '558 patent") of the present invention is an improvement thereon as will be described with reference to FIGS. 7-10.

However, in order to understand the improved system of FIGS. 7-10 better, the '558 system shall be described first with respect to FIGS. 1-6.

Dual control stations, e.g. a pilot station and a co-pilot station, are generally present in commercial aircraft and, accordingly, a first display system 10A and a second display system 10B are shown. In the disclosed system of the '558 Patent, the display systems 10A and 10B are functionally and structurally alike and equivalent to each other. For convenience and ease of description, a single such system, generically designated by reference number 10, will now be described and discussed. It will in any event be appreciated that the '558 system is equally applicable for use in aircraft equipped with only a single display system 10 and, indeed, the use of a pair of these systems in an aircraft (as shown in FIG. 1) is but one particular implementation and contemplated application.

Display system 10 includes a display screen 12 such as a liquid crystal display (LCD) or other illuminatable or otherwise viewable imaging display, either specially designed and constructed or, as for example known in the art, containing an array of individually-addressable pixels (i.e. picture elements) capable of operatively generating light at a range of selectively controllable intensity levels. Each pixel in the display has a corresponding address at which it can be individually accessed by control signals to graphically depict, in combination with other display pixels, images such as pointers and other indicators, simulated flight instruments and gauges, maps, terrain simulations, alphanumeric characters, etc. on the screen 12, as is known in the art, and is further capable of displaying or radiating a color component such as red, green or blue (RGB values) or combinations thereof In each display system 10, a dedicated symbol generator or controller 16 generates and outputs calculated imaging data that is used to illuminate the appropriate pixels in the respective or corresponding display screen 12 and thereby create the intended images on that display. The imaging data is derived or calculated by the controller 16 from sensor measurements and other input data and the like which is obtained from a plurality of aircraft and environmental sensors or inputs or other aircraft systems, collectively referred to herein as the sensors or sensor bank 18, disposed about and throughout the aircraft for ascertaining or "reading" the current values of often dynamically-varying flight control, telemetry, atmospheric, positional, and other aircraft and environmental condition information. The flight control reading and sensor systems may illustratively include or provide, by way of typical but nonlimiting example, altitude, heading and reference (AHRS) data; altitude, direction and control (ADC) data; navigational (NAV) data; automatic direction finder (ADF) data; global positioning system (GPS) data and devices; aircraft interface unit (AIU) data and devices; traffic alert and collision avoidance system (TCAS) data and devices; enhanced group proximity warning system (EGYWS) data and devices; and flight management system (FMS) data. As shown in FIG. 1, the display system 10 may also include or be disposed proximate or used in conjunction with one or more conventional backup or otherwise additional mechanical gauges or instruments, such as, for example, an attitude indicator 21, an altitude indicator 22 and an airspeed indicator 24.

The dual display systems 10A and 10B are simultaneously operated and operational such that a controller 16A provides data for rendering of images on display screen 12A (e.g. the pilot station), and a like controller 16B provides data for rendering of images on display screen 12B (e.g. the co-pilot station). As explained more fully below, a routing function or capability of the '558 system allows the data from either controller to be displayed on either or both display screens so that, in the event of a malfunction or other partial or complete failure of one of the controllers 16A, 16B, the other or remaining operational controller may concurrently provide imaging data to both displays 12A and 12B. This feature is indicated in FIG. 1 wherein each of the controllers 16A, 16B is shown in communication with both display screens 12A, 12B.

Figure 2:
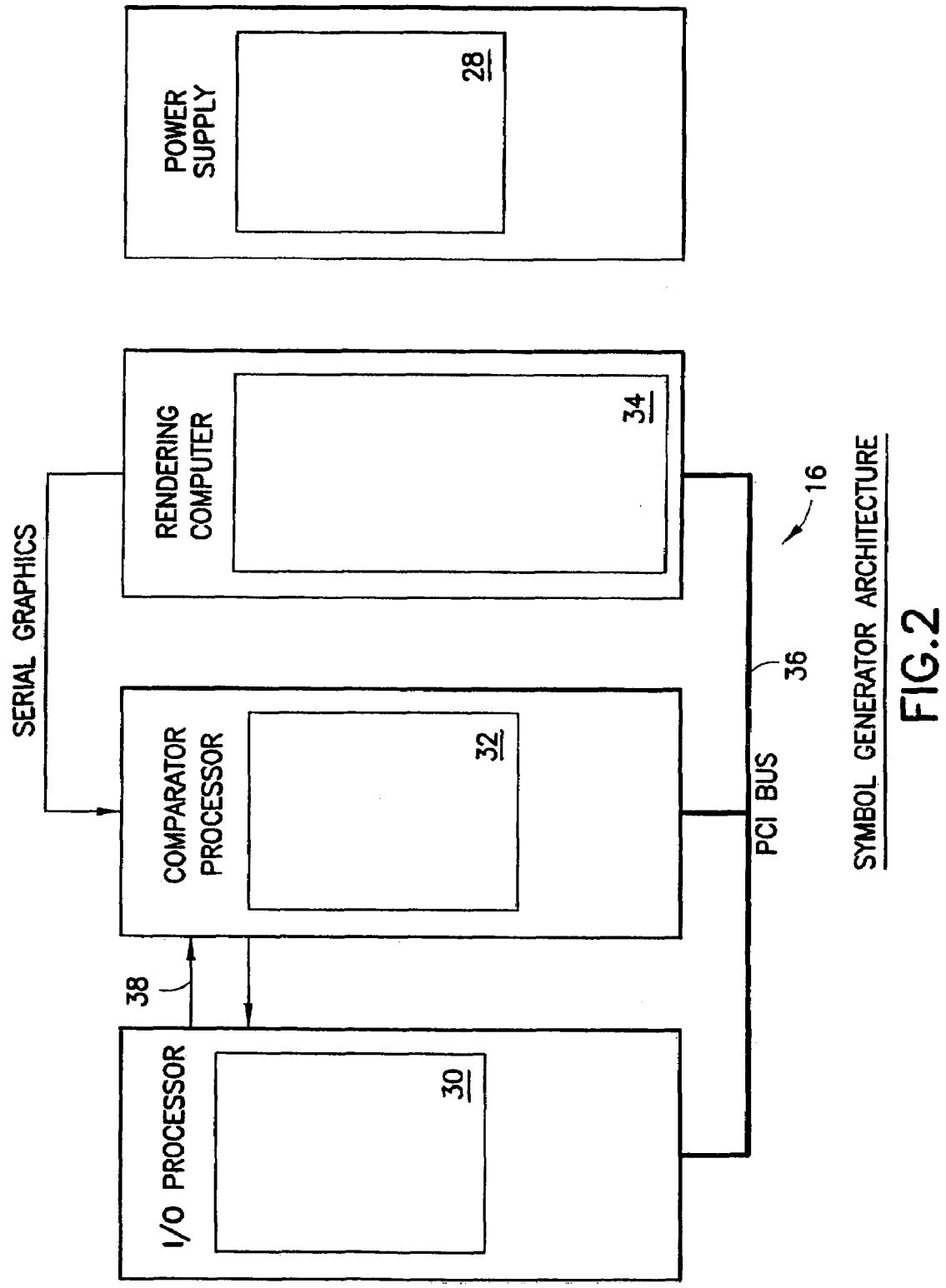

With reference now to FIG. 2, each symbol generator or controller 16 includes an I/O processor 30, a comparator processor 32, and a rendering computer 34 communicating with each other via a conventional PCI bus 36. As will be apparent from this disclosure, the use of a conventional bus design of common use in the personal computer industry provides particular advantages in the context of the '558 system for, inter alia, readily accommodating data transfer interconnection among the various components of the system as shown in FIG. 2 including, in particular, the rendering computer 34. I/O processor 30 receives or reads serial data from the aircraft sensors 18, and that data is placed in a storage buffer of I/O processor 30 for access by the comparator processor 32, and rendering computer 34 via PCI bus 36. In the illustrated '558 system, I/O processor 30 incorporates or utilizes a Motorola 8240 microprocessor and has 32 discrete inputs and 8 discrete outputs for communicating data between the sensors 18, the comparator processor 32, the rendering computer 34, and the display screens 12A and 12B. It is anticipated that the I/O processor 30 will have successfully undergone highly intensive FCC verification and validation testing—meaning (as is well known in the art and aircraft instrumentation industry) that every hardware and software pathway and instruction has been tested using the full range of data to which the I/O processor 30 is expected to be exposed during operational use. A parallel port bus 38, implemented using by way of example the known IEEE 429 bus architecture, is also provided for redundancy and to assure continued communication ability between the controller components of the system 10 in the event of a temporary or partial error condition or failure of the PCI bus 16. A power supply 28 is also provided, either as a part of or for use with the system, for supplying operating power to the I/O processor 30, comparator processor 32, and rendering computer 34.

Figure 3:
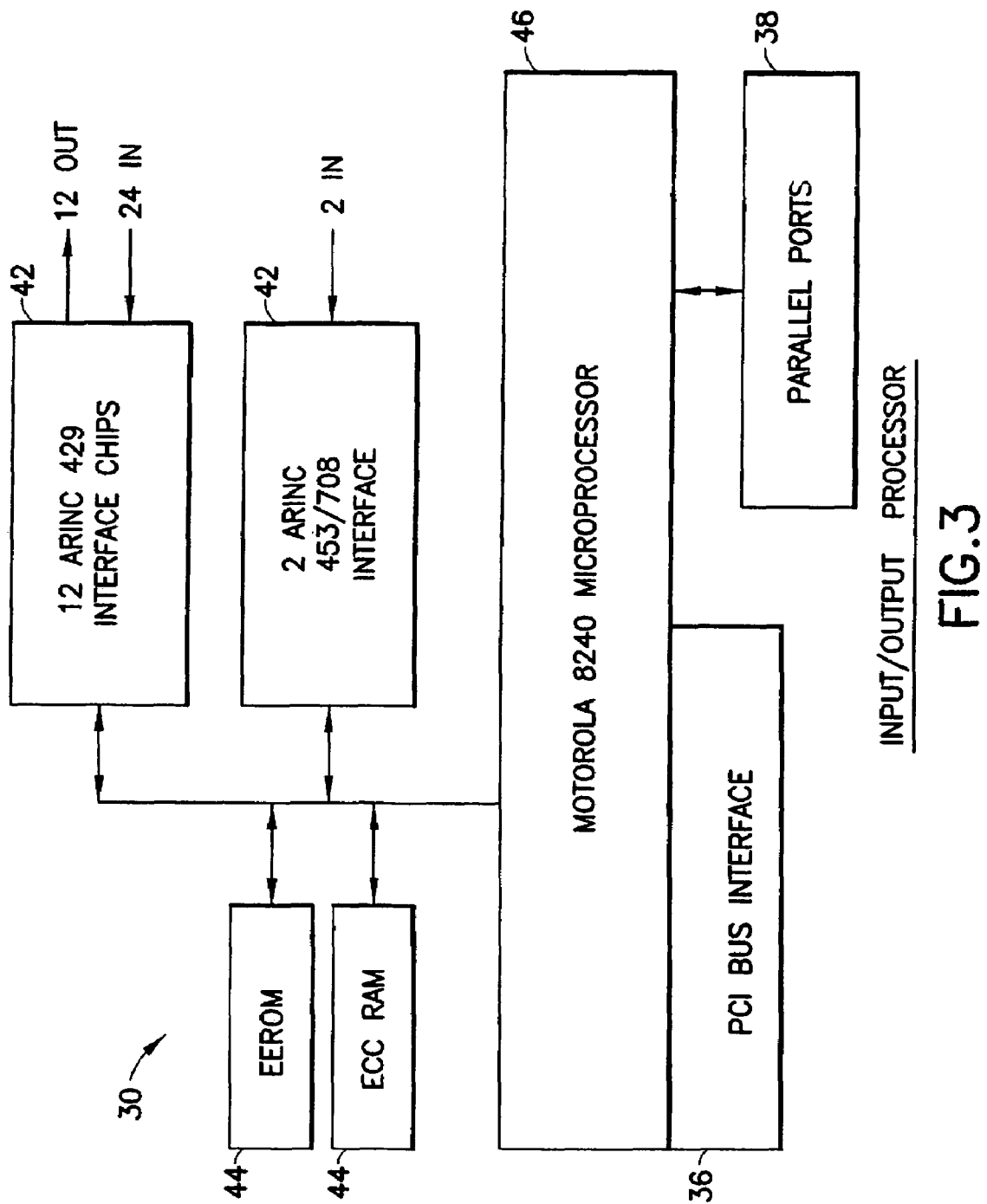

A block diagram of I/O processor 30 is presented in FIG. 3, wherein interface components (as for example in the form of one or more integrated circuit chips) 42 convey data to and from the I/O processor 30, and then to the comparator processor 32 and rendering computer 34, through the PCI bus 36 and parallel ports 38 under the control of microprocessor 46. Processing variables are stored in EEROM and ECCRAM memory 44.

Figure 4:
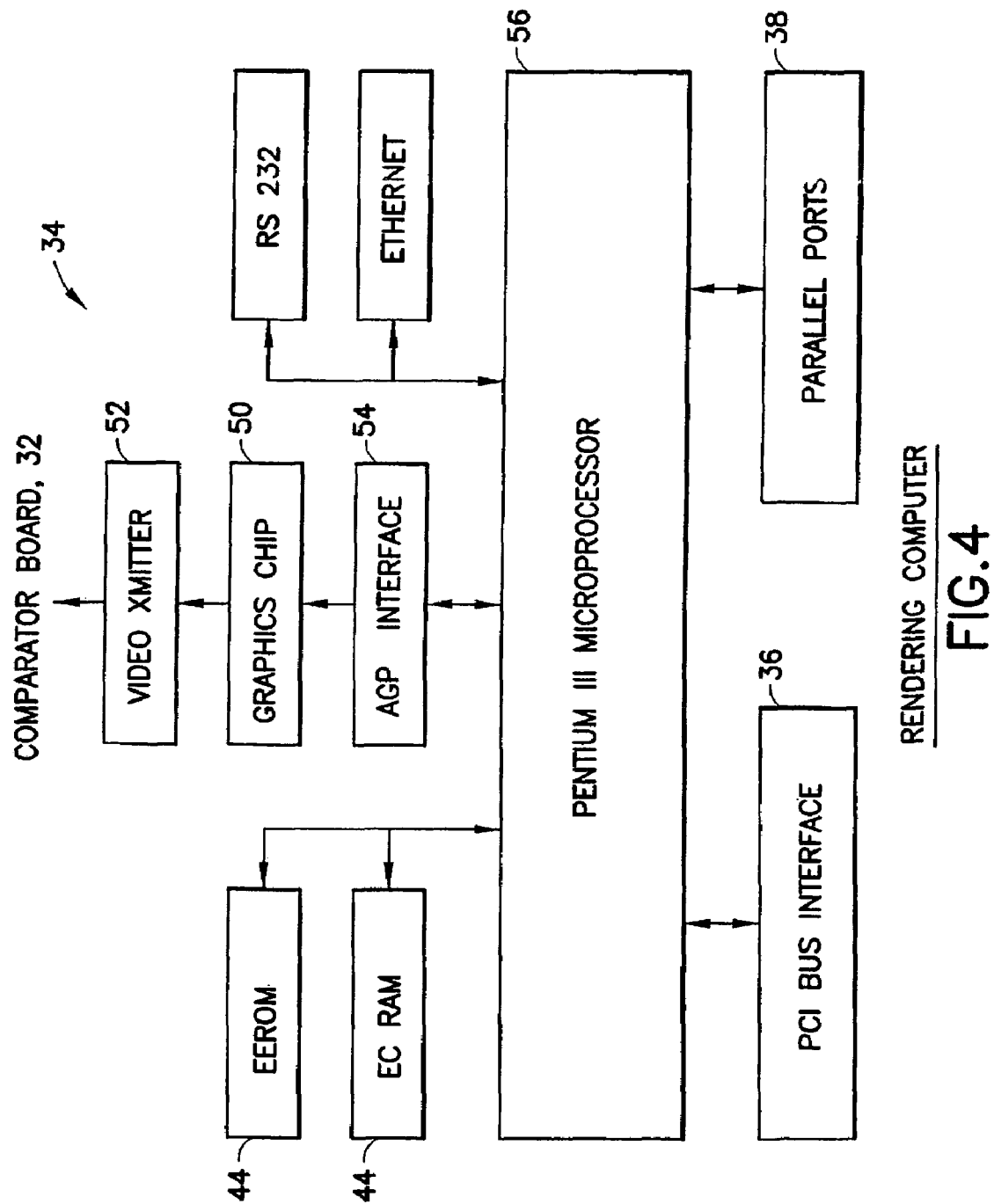

The imaging data for presentation on the cockpit-disposed LCD display 12 is generated by the rendering computer 34 which may be implemented by a substantially conventional single board, PCI-bus, so-called IBM-compatible computer that includes, as shown in FIG. 4, a graphics processor 50 in communication with a video transmitter 52 and an accelerated graphics port (AGP) interface 54. The video transmitter 52 provides rendered video data to the comparator processor 32 for comparison to select data test points (herein designated "points of light"), as explained below, and for imaging of the rendered data on the display screen 12. The single board rendering computer 34, which also includes a microprocessor 56 such as an Intel Pentium III or Pentium IV microprocessor, or a Motorola 750 microprocessor, may be an essentially off-the-shelf, commercially available, conventional motherboard-based personal computer—i.e. a computer not in general specially designed and constructed of customized components which have been expressly manufactured for the imaging of graphically-rendered aircraft instrumentation and dynamic aircraft operating data and information. The graphics processor integrated circuit chip or components (and, optionally, its associated support chips and/or components) may be mounted on a detachable mezzanine card that is carried on the computer motherboard for ready interchangeability and exchange of the graphics processor 50 as new and improved designs and capabilities of these conventional or commercial graphics processors become available. The graphics processor of the '558 system provides 24-bit color pixel word output, i.e. 8-bits each for blue, red and green, which outputs (together with a clock signal) are fed to a parallel-to-serial converter and, thereafter, to the display 12. The single-board rendering computer 34 per-forms all of the processing of the data for generating and placing of the desired images on the display, including the anti-aliasing calculations required to yield a smooth graphical representation of the displayed data and images.

A key to the '558 system is the provision and use—for generating of the dynamically-changing, processor intensive, fully anti-aliased images to be placed on the display 12 and that can then be utilized and relied upon by the flight crew to pilot the aircraft and maintain uninterrupted situational awareness of the operating characteristics and other essential information relating to the aircraft and the environment in which it is being operated—of a substantially conventional, commercially-available, off-the-shelf rendering computer 34 using the powerful microprocessors and graphics processors and supporting chip sets that are readily available in the marketplace at relatively low cost and which are regularly and frequently updated and improved. The ability to utilize such hardware, e.g. powerful, low cost Pentium-based single-board computers, and to periodically update at least the graphics processors thereof as new and more powerful and capable such processors become available in the marketplace, provides a tremendous advantage as contrasted with the use in aircraft display systems of specially custom-configured and designed graphics processors and display rendering sub-systems and the like. These custom-designed processors are extremely costly to develop and are rarely changed once installed in an aircraft despite continued and regular advances in technology that support the design and implementation of new processors with many times the power and capabilities of those already in use.

The '558 system provides a system that is operative to continuously assure the integrity, validity, reliability and accuracy of the information generated by the rendering computer for display on the display 12 through use of the associated comparator processor 32. In contrast to the rendering computer 34, the comparator processor 32 is preferably based on a specialized, custom design and is intended to be fully certified by the FAA using the most demanding tests and test procedures required for aircraft data graphical rendering display systems. This level of FAA certification testing is commonly referred to as modified condition decision coverage (MCDC). Thus, in accordance with the '558 system, confirmation of the reliability of the display data generated by the rendering computer 34 is provided by the comparator processor 32 which, prior to imaging on display 12 of the graphically-rendered information that is generated by rendering computer 34, operatively verifies a meaningful subset of the rendering computer display data to thereby dynamically assure the current and continued error-free operation and reliability of the rendering computer 34. The subset of display data subject to the verification process—those data points being sometimes referred to herein as the "points of light"—is specially selected to define a meaningful cross-section and set of the display data image parameters to achieve and assure the intended ongoing confirmation of error-free data reliability.

Accordingly, the impossible-to-attain need for high level FAA certification of the rendering computer 34 as implemented by the '558 system is avoided by providing, in its stead, such high level certification of the comparator processor 32. The advantage to this arrangement is that, as contrasted with that of the rendering computer 34, the hardware and software of the custom-designed comparator processor 32 is of a relatively simplified construction (with respect to both its hardware and software aspects) and, as such, the time and effort required to satisfy the most-demanding of FAA certification procedures for the comparator processor 32 is orders of magnitude less than would be required to correspondingly certify the rendering computer—assuming that such FAA certification of the rendering computer 34 of the '558 system were attainable under any circumstance. Moreover, because the comparator processor 32 is operable for processing and generating display data for only the so-called points of light, once certified and installed in an aircraft the comparator processor 32 need not be modified or upgraded or otherwise changed or replaced if, as and when the rendering computer 34—or at least the graphics processor 50 or sub-system of the rendering computer 34—is upgraded or replaced to take advantage of newly-available and/or more powerful or capable technology and chip designs. The data-verification functionality of the comparator processor 32, through comparison of the selected points of light with the display data for the corresponding display pixels as generated by the rendering computer 34, continues to provide a sufficient check on the rendering computer display data without regard to any enhanced processing power and/or capabilities that may be made available from the rendering computer 34 by way of upgrades or replacements of or to the rendering computer 34.

The notably reduced complexity—as contrasted with rendering computer 34—of comparator processor 32 is the result of a number of factors. First, the comparator processor 32 is operable for the processing and generating of display data for only a predetermined finite number of display points—i.e. the points of light—and as such its hardware and software is custom-designed and configured for correspondingly limited processing operations. Thus, unlike the rendering computer 34, which must generate the color and intensity data for imaging presentation at each and every one of the pixel locations on the display 12, the comparator processor 32 only generates the color and intensity data for a limited, predetermined number of display pixels. For example, for a flat panel LCD display screen of 9 by 12 inches having a resolution of 1024×768, the rendering computer 34 must provide the image data for about 800,000 pixels and update that image data a hundred times each second. The number of points of light for which the comparator processor 32 is required to generate display data for each such display update interval, on the other hand, will preferably be on the order of several hundred pixels. In addition, since the comparator processor 32 operatively calculates the display data for only a finite number of selected points of light located selectively about the field of display 12, it is unnecessary for the comparator processor to perform any anti-aliasing processing in its calculation of the points of light display data. Anti-aliasing processing routines are highly complex and processor-intensive and the omission of anti-aliasing processing in the comparator processor 32 notably simplifies the construction and operation of its custom-designed hardware and software.

Thus, in accordance with the '558 system, a second computer, namely the comparator processor 32, is likewise connected to PCI bus 36. Comparator processor 32 receives from I/O processor 30 the same sensor inputs and data as does rendering computer 34 but has significantly less intensive and demanding data generating requirements as compared to the rendering computer 34. Instead of generating the data necessary for imaging on display 12 all of the fully anti-aliased, alphanumerically and graphically-presented information upon which the flight crew is intended to rely in operating the aircraft, as is required of rendering computer 34, comparator processor 32 generates the display data for only a limited number—as for example between about 100 and 300—of specific data points which are used as test or integrity check points for verifying the accuracy of the display data that is generated by rendering computer 34. In the '558 system, it is generally intended that these "points of light" be selected to coincide with a representative set of points located at positions throughout the display field at which data for important aircraft and environmental and situational parameters and indications are being imaged at each periodic refresh of the display 12. Thus, it is desirable to include in the selected points of light a plurality of display pixels that are being activated by the rendering computer data to image parts of one or more of, by way of illustrative example, alphanumerically-presented information, graphically-defined pointers and other indicator lines of graphically-imaged flight instruments and gauges and the like, graphical lines and/or alphanumeric characters of numeric scales, portions of graphically-imaged map or chart lines or features, and other dynamically-updated display elements. Some points of light may also be selected to correspond to predetermined static (or otherwise less frequently changing) portions of the display field, such as on or along graphically-presented flight instrument borders or other generally static display features or elements.

What should, in any event, be understood and apparent is that the selected points of light will not in general (or at least for the most part) correspond to specific, fixed, unchanging, predetermined pixel locations on the display 12; rather, they will primarily identify particular data display elements whose pixel positions or locations within the display field will often or from time-to-time change as the display image is repeatedly refreshed or updated. Thus, for example, on the rotatable pointer of a graphically-imaged airspeed indicator three points of light—corresponding to the two ends and an equidistant or central or other predetermined location along the length of the pointer—may be defined and, as the position or rotated orientation of the pointer shifts with changing airspeed, the specific display pixel locations at which those three data points will be imaged will likewise change. Similarly, where certain data is alphanumerically presented, a predetermined number of locations on each alphanumeric character may be selected as points of light, and the display pixel locations of those selected alphanumeric character data points will change as the alphanumeric character changes. Thus, where aircraft altitude is presented using alphanumeric characters at a particular location on the display 12, the selected points of light of the least significant digit for a graphically defined number "7"—such for example the two end points of the representation and the intersection of its connected legs—will always be presented at the same display pixel locations, but the display pixel locations of those points of light will change when the numeric character changes to, for example, a number "3" for which the designated points of light may be its two end points and the intersection of its two arc segments. Optionally, one or more selected additional points along the curved arc segments of the number "3" may also be defined as points of light for that digit, so that the number of points of light used to check the accuracy of an alphanumeric digit (for example) may change from update to update of the display field as a function of the particular digit being displayed. As will therefore be apparent, the exact number of points of light that are used in implementing the '558 system may vary from scan to scan of the rendered display field as at least some of the data being imaged on the display 12 changes from one screen update or refresh to the next.

Figure 5:
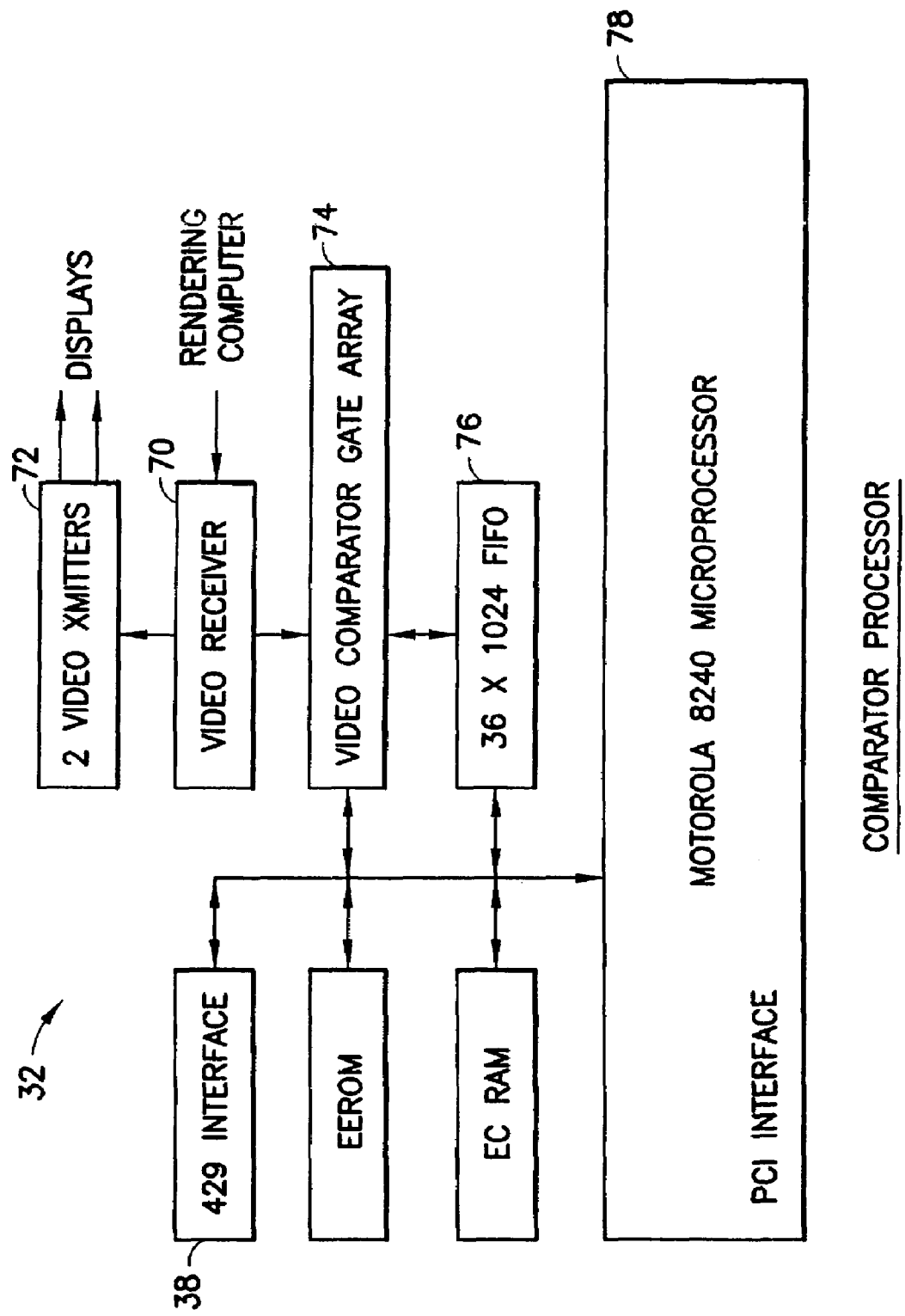

With reference now to FIG. 5, the comparator processor 32 receives the anti-aliased graphics imaging data from rendering computer 34 at a video receiver 70 which is connected to a video comparator gate array 74 and a pair of video transmitters 72—one transmitter 72 for feeding each of the displays 12A, 12B. As noted above, each point of light generated by comparator processor 32 may consist of three 8-bit bytes (one byte for each of the colors red, green and blue) for a total of 24 bits. The point of light data bits are stored in a FIFO stack 76 in communication with a microprocessor 78. The data stored in FIFO 76 for each point of light comprises the three 8-bit RGB color bytes and clocking data identifying the display screen pixel location at which that point of light should be displayed; the clocking data is used to synchronize the comparison of the point of light color data with the color data for the corresponding screen display location as generated by rendering computer 34. The data bytes for the points of light are loaded into FIFO 76 in the order in which they will be rendered on display 12 as the display image data is to be fed to the display 12, as for example by sequentially scanning or tracing across each horizontal trace line of the display field.

Figure 6:
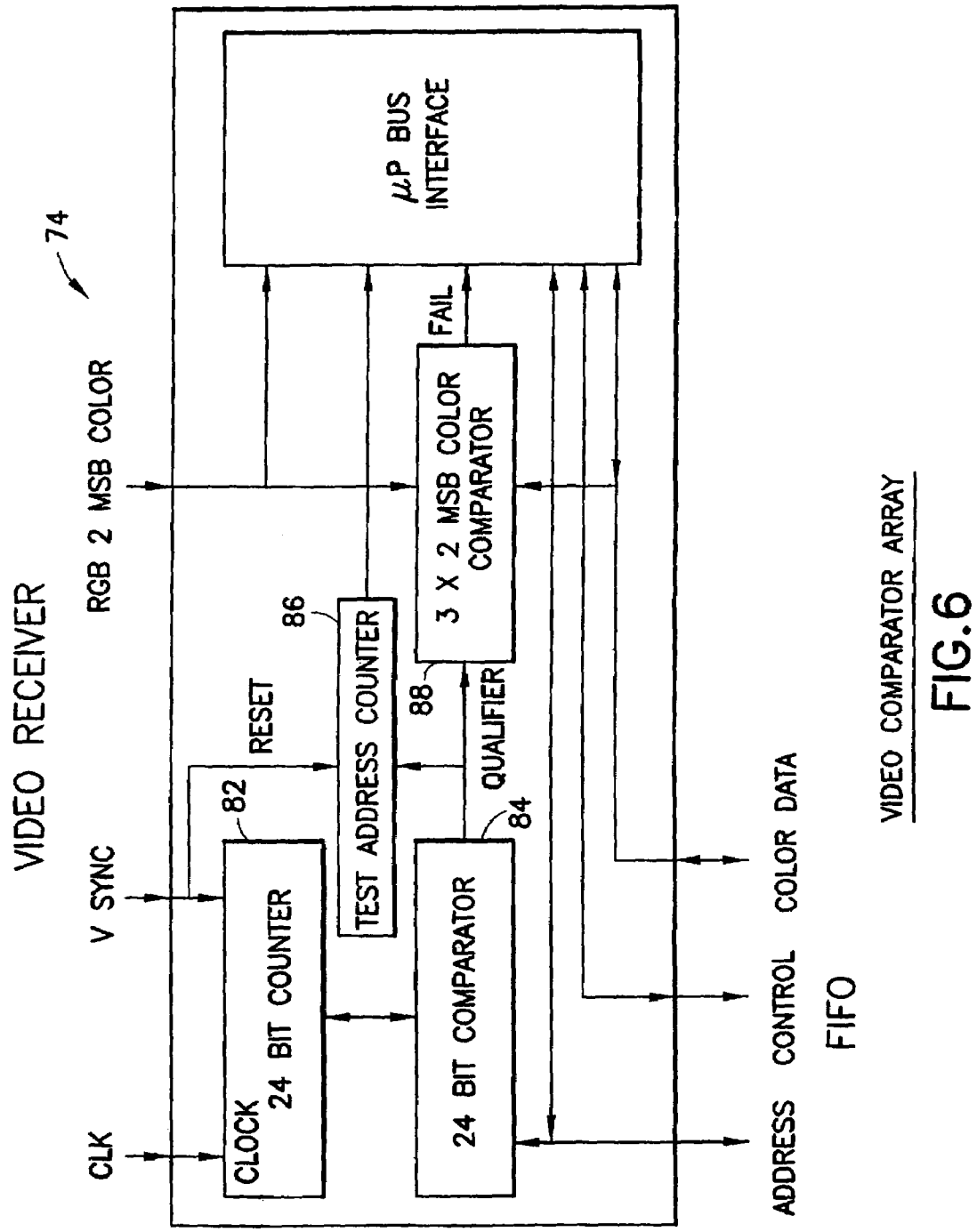

As shown in FIG. 6, a 24-bit counter 82 receives clock and vertical synchronization signals from video receiver 70 to identify the locations (i.e. the sweep addresses) on the screen display 12 at which the rendering computer-generated imaging data is to be displayed. As the clock signal from the video receiver 70 causes the counter 82 to cycle through each of the address locations that collectively define a complete imaging scan of the screen display 12, a 24-bit comparator 84 receives the current address from the counter 82 and, from FIFO 76, the intended display address of the next-available point of light data that is stored in the FIFO. When those two addresses match, comparator 84 enables a "qualifier" output to a color comparator 88 which then compares, for the current screen display location address, the RGB color data generated by rendering computer 34 for output to display 12 and the point of light data generated by comparator processor 32 and stored in FIFO 76. Thus, when comparator 84 determines that counter 82 holds the address of the screen display location of the next-available point of light data on top of the FIFO stack, it causes the color comparator 88 to compare the rendering computer-generated color data from video receiver 70 with the point of light color data stored at the top of the FIFO stack 76. Test address counter 86 sequences FIFO 76 so that the address and color data for the next point of light stored in the FIFO is now placed at the top of the stack for address comparison in comparator 84 and color data comparison in color comparator 88 as counter 84 continues to sequence through the screen data addresses of the rendering computer imaging data.

In accordance with the '558 system, color comparator 88 may compare only the two most significant bits (MSBs) of each of the three (i.e. red, green and blue) 8-bit bytes of the color data generated by the comparator processor 32, on the one hand, and the rendering computer 34, on the other, for the same screen display pixel location. This comparison of only a part of each color information data byte is appropriate and yields a meaningful assessment of the reliability of the rendering computer data because the pixel color data generated by the comparator processor 32, unlike the imaging data that is output by rendering processor 34, is not anti-aliased. At any given display point or pixel location, anti-aliasing of the initially calculated data intended for display—through selective actuation of pixels adjacent to the given pixel location and a corresponding reduction of the intensity (i.e. color values) of the given pixel location to thereby smooth the resulting graphical image—may reduce the intensity of the given pixel location by as much as three-quarters (i.e. 75%) from the originally-calculated, aliased color values of one or more of the three color bytes. As a consequence, if at least the two MSBs of each of the three (red, green and blue) color data bytes generated by each of the rendering computer 34 and the comparator processor 32 for a given screen display pixel location are determined to be the same, then the rendering computer imaging data for that pixel location is deemed reliable.

Although in the above example only the two MSBs of each of the color data bytes are compared in assessing the reliability of the imaging data generated by the rendering computer 34, additional bits of the color data bytes may be utilized in that comparison. Thus, by way of illustration, the four MSBs of each color data byte may instead be compared and, if necessary or appropriate based on the anti-aliasing algorithms or methodologies or characteristics being employed or on any other relevant aspects or factors, the manner in which the results of the color data comparison are evaluated for determining from such results the reliability of the corresponding rendering computer data may be suitably modified from that which is described herein. Any such changes in the various herein-illustrated and described elements and components and subsystems of the inventive system, and/or in their inter-connections and operations, or otherwise in connection with the process steps for effecting the comparison or identifying a successful comparison or an error condition, that may be necessitated or desirable to accommodate such modifications will be apparent to, and are deemed to be within the normal abilities of, those having ordinary skill in the relevant arts.

As the imaging data generated by rendering computer 34 and serially fed to the video receiver 70 is successfully verified, via color comparator 88, against the points of light data generated by comparator processor 32 and stored in FIFO 76, the rendering computer data is directed from video receiver 70 through the video transmitter 72 to create the intended images on screen display 12. The video receiver 70 converts the serial imaging data from the rendering computer 34 to parallel form and buffers it for, respectively, presentation of the buffered RGB data for the selected (i.e. points of light) locations to the comparator array 74 and presentation of the buffered RGB data for the entire screen display field image to the video transmitter 72. Video transmitter 72 converts the rendered parallel RGB data to serial form and directs it to the respective display 12.

Generally, under normal conditions, only one of the video transmitters 72 will be active to operate its respective display 12 with the rendering computer imaging data. Nevertheless, the comparator processor 32 may be constructed so that, if necessary or desired, the imaging data generated by rendering computer 32 of one of the dual display systems on an aircraft can be used for concurrently operating both of the displays 12A, 12B through the respective video transmitters 72 of the rendering computer 34. This may be deemed appropriate or necessitated, for example, by a detected failure or error condition of the other symbol generator 16 as explained below.

If the color data comparison effected by color comparator 88 for a particular screen display pixel location determines that the rendering computer 34 and point of light data are not the same, or are not otherwise within predetermined acceptable parameters of difference that predeterminately define a successful comparison, then a comparison failure or error signal is generated and provided to the microprocessor interface of comparator processor 32. Although the '558 system may log each and every such comparison failure, the system may delay further action (e.g. reporting of the error to the flight crew) on the detected comparison failure for a period of time sufficient to determine whether the failure is the result of a temporary or nonrecurring glitch in the sensor data or data calculations or, to the contrary, evidences a possible systemic or other continuing failure that renders the data being generated by the rendering processor 34 for imaging on display 12 seriously suspect and unreliable. This delay may for example, be effected by determining whether a comparison failure is identified for the same point of light data location over a predetermined plurality of display update cycles; since the display 12 may be updated on the order of 100 times each second, the results of color data comparisons for each screen display location can be noted for a sufficient number of consecutive display updates to enable effective assessment of the error without endangering the aircraft or unacceptably delaying notification of a failure event indicative of unreliable rendering computer data. Thus, by way of illustration, the identifying of five consecutive color data comparison failures for a screen location of a particular point of light—which will only involve a period on the order of 0.05 seconds—may in a particular implementation be deemed sufficient to indicate unreliability of the rendering computer data that includes the point of light location at which the comparison failure has repeatedly occurred. An error signal may then be generated and a visual error indication presented on the one or more of the screen displays 12 being driven by that symbol generator 16 and, optionally, in any other fashion that will be apparent to the flight crew such as by way of an audible alarm.

The error indication may be visually presented on the display 12 in any suitable manner as a general matter of design choice. The graphical display portion or imaged gauge or indicator with respect to which the data error has been detected may be modified or overwritten to evidence that its indications are or may be incorrect, as by rendering a large "X" or "FAIL" or "ERROR" legend over or across the display portion or imaged indicator or by changing the color in which it normally appears. Thus, detected errors in the display data generated by the rendering computer 34 for one or more points of light locations in the graphically-imaged airspeed indicator can be indicated by rendering a large "X" over the location of the graphical airspeed indicator on the display 12. The system may thereafter, either automatically or in response to pilot or operator interaction, discontinue the presentation of that indicator image on the display 12 using the imaging data generated by the controller 16 from which the, error was detected, and replace the indicator image on that display 12 with imaging data generated by the controller 16 of the other cockpit display system, so that the same symbol generator 16 will thereafter supply the imaging data for that indicator image to both displays 12A and 12B. Alternatively, the graphical image of the "failed" indicator—bearing a visually-perceptible failure indication—can be maintained on the display 12 which received the unreliable data, with both the pilot and co-pilot, thereafter, viewing and relying on the display of that instrument on the other screen display 12 of the aircraft dual flight panel display system of the invention. It is also contemplated that, either as a matter of design or operator choice, detection of an error or failure of any subset of the data generated by one of the rendering computers 34 may result in replacement of the entire display field image previously supplied with data from the error-producing rendering computer 34 with the imaging data generated by the other rendering computer 34.

The '558 system provides enhanced integrity and reliability of the graphically-imaged data by virtue of the relative simplicity of the comparator processor 32 (as contrasted with prior art display flight display systems) since less complex operating code is inherently more trustworthy and reliable; however, as will be explained further below with reference to FIGS. 7-10, even greater enhancements may be made to the '558 system with respect to enhanced integrity and reliability of the graphically-imaged data in accordance with the present invention.

The key to the system of the '558 patent, as implemented in the primary contemplated application of an aircraft flight information graphical display system, is the operational division of the display system into two basic functional parts—one (the rendering computer 34) which is responsible for display availability or reliability, and the other (the comparator processor 32) which provides or assures display integrity. The FAA requires that an aircraft primary flight display system must have availability, i.e. reliability, that is comparable to existing systems with a relatively low probability of loss of function. In other words, the system must be sufficiently reliable to assure continuous availability of the data to the flight crew for operating the aircraft. To satisfy this first FAA requirement, the software must be verified to industry standard DO178 level C, which requires that the software must undergo documented testing to assure that it functions properly and that all of the software code is executed during its testing.

The FAA further requires that an aircraft primary flight display system must meet specific levels of integrity—namely, that it be demonstrated that the system cannot output any misleading or unannounced incorrect information. It will be appreciated that the precertification testing necessary to demonstrate and document the satisfaction of this second FAA requirement is much more rigorous than that required to satisfy the first requirement of system availability. Specifically, to evidence integrity the system software must be verified to industry standard DO178 level A, in which all logic paths must be tested with multiple values representing all data values that the system would be expected to see in use, commonly referred to as multiple condition decision coverage or MCDC. In addition, all of the hardware must demonstrate like performance, and the historical development or heritage of the system hardware must be thoroughly documented.

Since the rendering 34 computer is operatively responsible. solely or display availability, it need only satisfy and be tested to the industry standard DO178 level C standard to achieve the necessary FAA certification, thereby permitting use of relatively complex, commercially-available, off-the-shelf computer systems which can be efficiently and economically verified to the specified DO178 level C standard both as initially utilized and as thereafter upgraded from time-to-time with newly available, enhanced components and capabilities and the like. Thus, use of a rendering computer 34 that requires only the less rigorous DO178 level C testing to achieve FAA certification enables the a system to utilize advanced hardware and software with resulting increased display functionality and ready upgradeability as enhanced components and subsystems and the like periodically become commercially available after initial installation of the display system.

Display integrity in the '558 system, on the other hand, is provided and assured by the comparator processor 32 which must accordingly be verified to the DO178 level A standard to achieve FAA certification. This will generally require custom-designed hardware and software that must undergo rigorous, extensive, time-consuming and expensive testing and documentation. But because the comparator 32 processor operatively generates, and compares to the rendering processor 34 output, only a relatively small subset of the universe of data that is used to graphically populate and image the display 12, and further because the comparator processor 32 need not perform anti-aliasing processing of the data that it generates, its operating software and hardware is significantly simplified from that which would be required to generate an entire display screen or region of anti-aliased graphical display data. As a consequence, the hardware and software of the comparator processor 32 can be tested and verified to the more rigorous DO178 level A standard to assure system integrity. In addition, because the comparator processor 32 in the '558 system is operative for generating only the subset of comparison display pixel (or object) data, changes or updates of, or enhancements to, the rendering computer 34 will not generally require or warrant any retesting or recertification of the comparator processor 32, thereby further facilitating future display system upgrades without unanticipated or unusual cost or effort.

Figure 7:
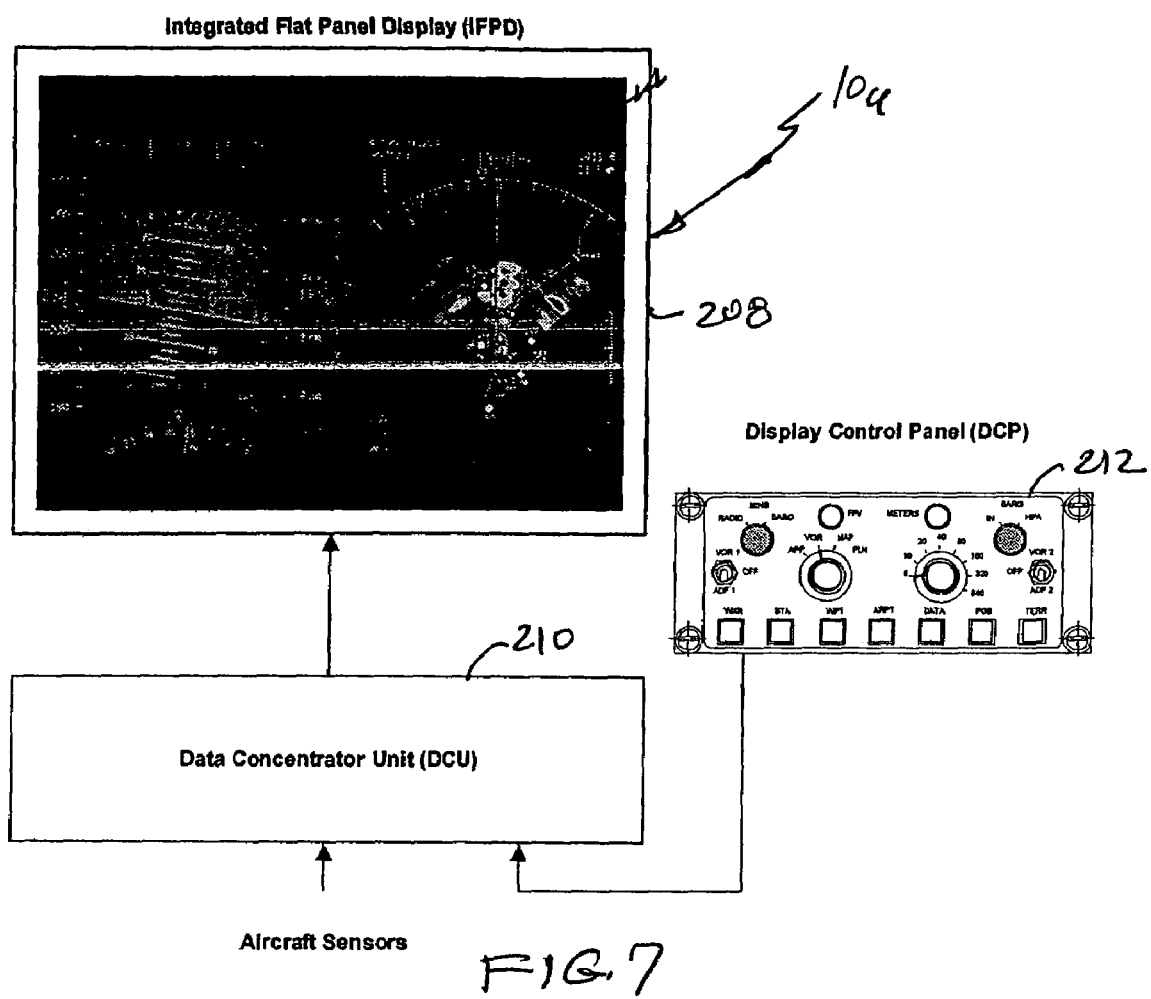
FIG. 7 is a block representation of the presently preferred improved system of the present invention.
Figure 8:
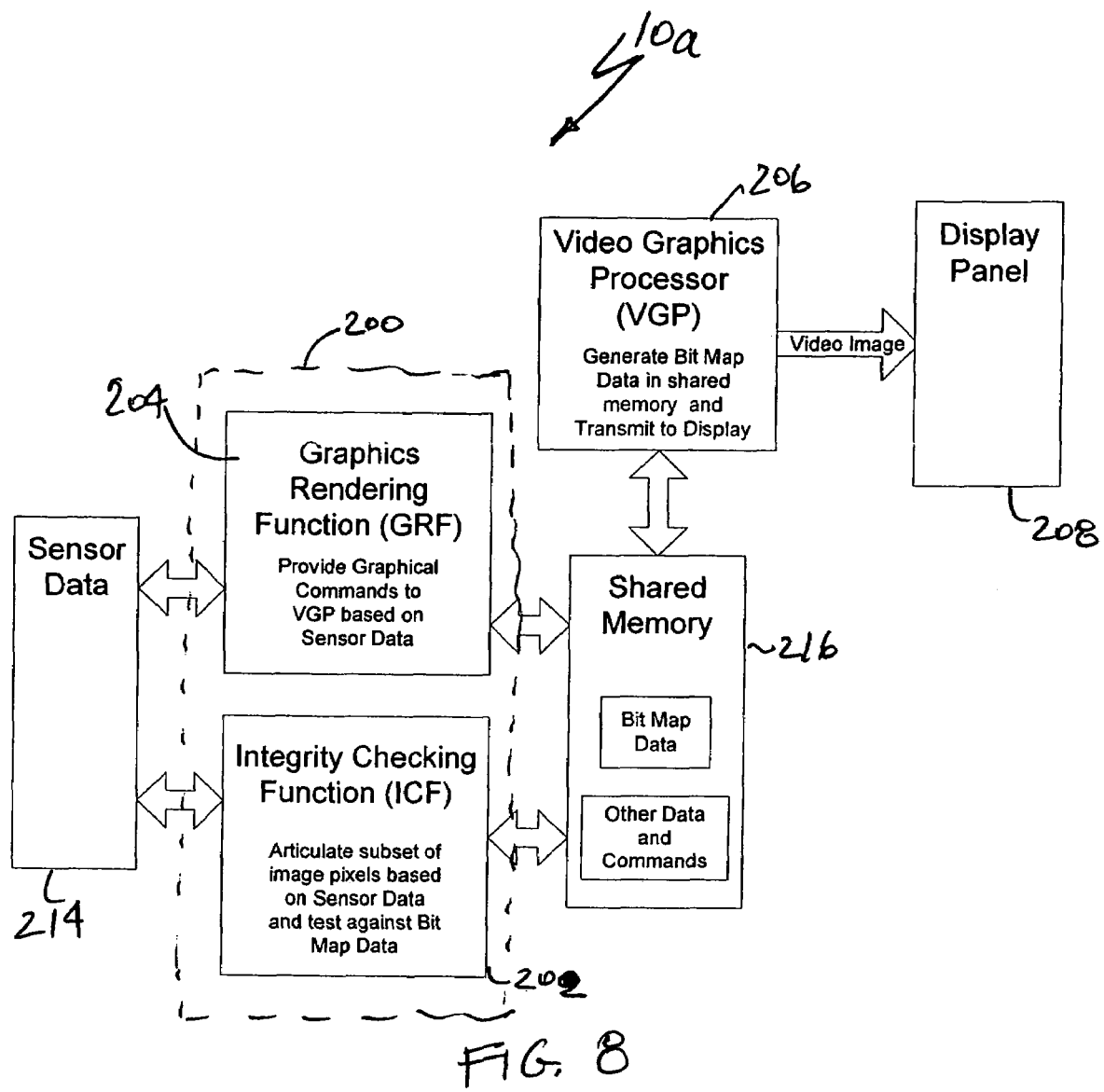
FIG. 8 is a functional block diagram of the system of FIG. 7 employing a software comparator in accordance with the present invention.
Figure 10:
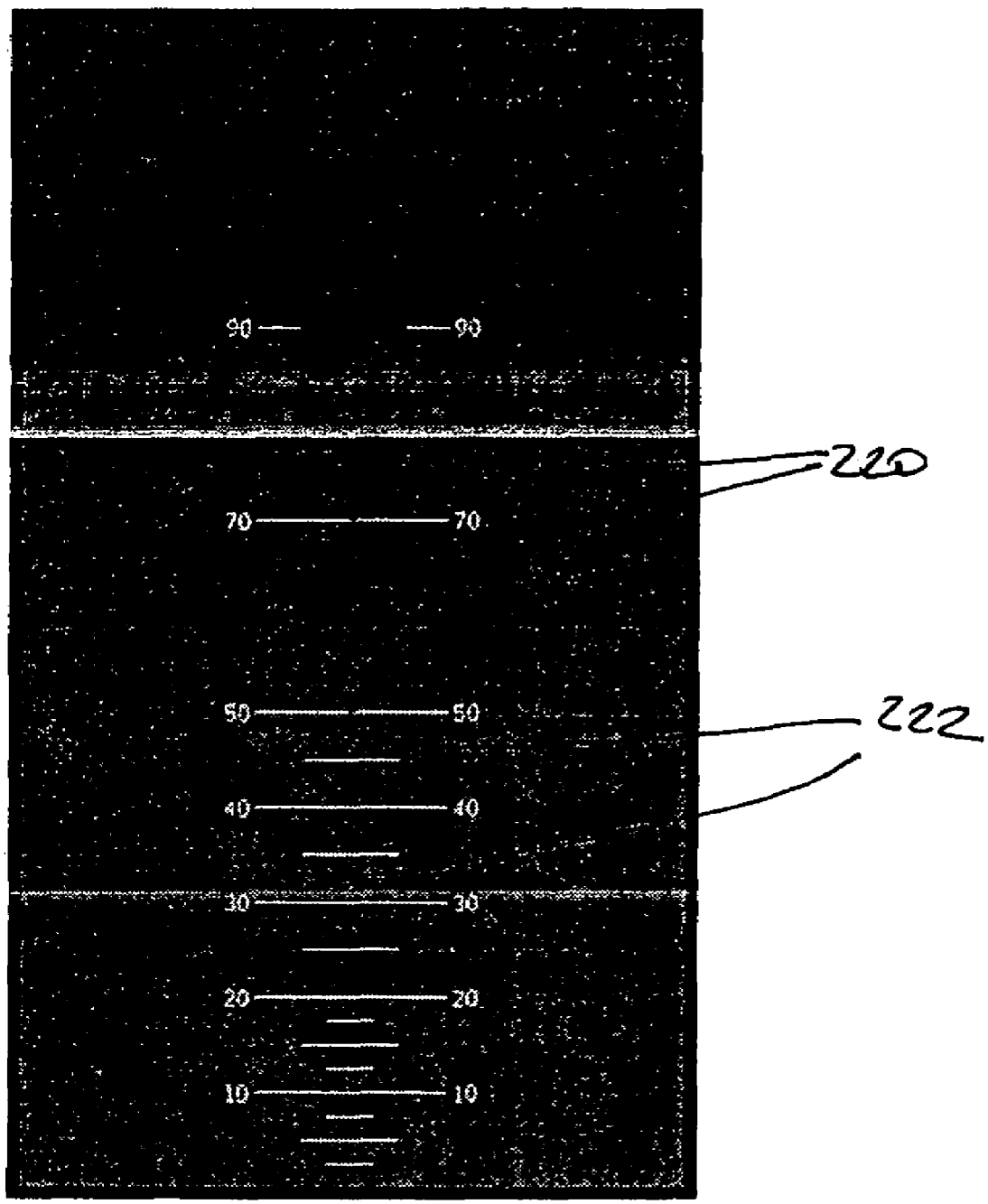
FIG. 10 is an illustrative example of a display, in accordance with the present invention, having an ADI background with watermarks.

Now referring to FIGS. 7-8 and 10, the enhanced system 10a of the present invention is shown in which, inter alia, the comparator processor hardware 32 has preferably been eliminated. Moreover, as will be described hereinafter, preferably the flat panel display system 10a may consist of a single processor system 200 in which the integrity checking function or ICF 202 and the graphics rendering function of GRF 204 are incorporated in the same processor 200. In addition, the presently preferred system 10a also includes s video graphics processor or VGP 206. As shown and preferred in FIG. 7, the enhanced flat panel display 10a consists of an integrated flat panel display screen 208, such as previously described herein, a data concentrator or DCU 210, and a display control panel or DCP 212. The display control panel 212 preferably contains the previously mentioned input/output processor cards 30 (see FIG. 3) which communicate the aircraft data to the integrated flat panel display screen 208, such as the type of display screen 12 previously described which may, for example, be an active matrix liquid crystal display such as the type manufactured by Innovative Solutions & Support, Inc., of Exton, Pa., the assignee herein.

The integrated flat panel display system 10a preferably contains the display screen 208 and backlight assembly as well as the graphics generation module preferably consisting of one or more microprocessors performing the integrity checking function 202 and the graphics rendering function 204 illustrated in FIG. 8. The display screen 208 may be of the type previously described with respect to screen 12 which is, for example, be an active matrix liquid crystal display such as the type manufactured by Innovative Solutions & Support, Inc., of Exton, Pa., the assignee herein. Preferably, the integrated flat panel display system 10a employs software partitioning in which any misbehavior of the graphics rendering function 204 does not impact the integrity checking function 202. Preferably, the integrity checking function 202 checks all features in the display 208 that are related to primary flight data for correct positioning on the display 208. If a discrepancy is detected, the error is preferably flagged to the pilot. Moreover, as shown and preferred in FIG. 8, the graphics rendering function 204 operates on the same sensor data 214 such as provided by sensor bank 18, as the integrity checking function 202 and provides graphical commands to the video graphics processor 206 based on the sensor data 214, via the shared memory 216 in order to generate a bit-mapped display on the display screen 208, with the bit-mapped display being formed by a multiplicity of individually addressable pixels at locations throughout the display 208 which are conventionally actuatable to create images on the display 208. The sensor data 214 as previously discussed, is preferably based on a common set of aircraft and environmental sensor data as was described with reference to sensor bank 18.

As previously described with reference to the '558 system, a typical PFD/ND display format is intuitive and provides the pilot with all of the flight related data in a comfortable viewing format with tape airspeed and altitude, along with a basic navigation display map with weather radar, TAWS, TCAS and flight plan overlays, with the format usually being designed to closely replicate the look and feel of the original cockpit layout, including, for example, a graphical representation of round gauges. Although, not part of the present invention, the data concentrator unit or DCU 21 and the integrated flat panel display system 10a may be collocated, if desired, in the same housing, and the display control panel or DCP 212 may be integrated into the display bezel. Moreover, if desired, the display 208 may be broken into a number of displays instead of a single composite display, with each display presenting a different functionality and providing redundancy in case of a failure.

As was previously described with reference to FIG. 8, the main functionality of the processor 200 is preferably broken into the two components of the integrity checking function 202 and the graphics rendering function 204, with the presently preferred single processor implementation incorporating both of these functions in the same processor. Alternatively, the system 10a of the present invention may employ a multi-processor system in which more than one processor performs the total functionality. In either instance, the integrity checking function 202 is preferably used to verify the proper functionality of the video graphics processor 206. As noted above, the video graphics processor 206 takes the commands provided by the graphics rendering function 204 and generates the digital video information to be displayed on the display screen 208. The graphics rendering function 204 preferably uses the common set of sensor data 214 to generate the display output information via the video graphics processor 206, as previously described, while the integrity checking function 202 uses the sensor data 214 to articulate a subset of pixels generated by the video graphics processor 206, which are tested against the bit map data in the shared memory 216.

In accordance with the currently preferred embodiment of the present invention, the graphics rendering function 204 generates rendering calls to the video graphics processor 206 which, in turn, generates the display image in the shared video memory 216. The video memory 216 is preferably set up to provide multi-buffering of display frames to prevent tearing on moving displays. Accordingly, the graphics rendering function 204 notifies the integrity checking function 202 of the memory location of the latest rendering into the video graphics processor 206, which is mapped into the common addressing space in the shared memory 216. The integrity checking function 202 preferably uses the input information provided thereto to generate a pixel verification map for individual features. This pixel verification map preferably consist of one or more check pixels that are identified, respectively, by an associated X and Y location on the display screen 208 and the particular color associated with that pixel. The integrity checking function 202 preferably uses this pixel verification map and compares the pixel against what information has been rendered by the video graphics processor 206 in the video memory 216, as illustrated in FIG. 8. As shown and preferred in FIG. 8, this is accomplished without having to employ a hardware comparator, such as the comparator 32 referred to in the foregoing description of the '558 system which the present invention is an improvement upon.

The video graphics processor 206 preferably allows for anti-aliasing, which may normally be turned on for moving displays, which preferably causes the display symbology to appear smoother on its color transition points, particularly when features move on the display screen 208. In the currently preferred system 10a, the integrity checking function 202 processes the check pixels or fiducials and compares them against the pixel verification map for detecting any discrepancies between what has been drawn by the video graphics processor 206 for providing an independent verification of the output image. In so doing, the integrity checking function 202 preferably uses the exact pixel locations of the check pixels and directly reads back the associated color information from the video memory 216. Thus, the associated color value in the color information that it reads for a given pixel location is compared against its full accuracy, such as preferably for a 24-bit color depth, or masked to eliminate any color offsets that may have been generated due to anti-aliasing or other drawing techniques that may influence the appearance resulting object. Consequently, the mask may preferably verify just the presence of a color pixel to ensure that the information has been drawn at the correct location.

The present invention is also useful in connection with the display of textured objects of the type which are conventionally provided by currently available graphics processors such as ones comprising rendering buffers that can be rotated, translated and mapped into the display buffer. As illustrated in FIG. 10, for complex objects such as the EADI, a complete CRC checked textured map 220 of the object may be created. Special markings or watermarks 222 are placed on the object that are close to the background color. The color shades are preferably chosen so as to normally not be distinguishable to the typical human eye while still being able to have any difference in color between the watermarks 222 and the background detectable by the integrity checking function 202. For example, in the blue portion of the ADI background, the primary color of the background is red=0x3 f, green=0x3 f and blue=0xff, whereas for the watermark pattern 222, the color preferably could be red=0x40, green=0x40 and blue=0xff. In such a situation, the integrity checking function 202 would see these colors as different while these colors would normally appear identical to a typical human eye. Thus, the unique pattern 222 on the ADI background can be utilized to check for pitch and roll accuracy.

In accordance with the present invention, some display images may be detected fully by checking for a single pixel on the image in successive frames. Preferably, in order to accomplish this, a different point of the image segment on each frame is checked until all of the points on the image are checked. Checking points beyond the perimeter of the image and detecting the background color enables detection of the actual perimeter of the image.

In a typical display 208, some objects may be drawn over others. In such an instance, the integrity checking function 202, in accordance with the present invention, may track these overlapping objects which overlap selected pixels by preferably breaking occluding objects into convex shapes. In such an instance, the integrity checking function 202 internal state machine is preferably utilized to orient the vertices of these convex shapes. Preferably, for every object with points to be tracked, two functions are set up; one to test if any point in that object is inside a given area, and one to test if any point in a given object is occluded by an object. To test if a point is inside a given convex area, each face of the convex object is preferably tested. Preferably, if all the sides of the convex object form a right hand turn with respect to the tested point, then the point is inside or covered up by the convex shape. Similarly, if the point is in line with any side or is a left-handed turn with respect to the side, the point is outside of the convex shape.

In order to check the integrity of complex images that are not deterministically articulated due to the complexity of the anti-aliasing algorithms within the video graphics processor 206, a statistical method of detection is preferably employed in accordance with the present invention. In such a situation, a certain number of mismatches between the rendered image and the articulated pixels is normally expected and, accordingly, a sufficient number of points are preferably selected to assure a high probability of detecting misleading images with a low probability of false alarm. By way of example, if the complex image contains an array of 1024×768 pixels, or 786,432 pixels, and each pixel contains three sub-pixels, red, green and blue, the image is preferably refreshed once every 50 milliseconds with a stream of data that contains 12 bits of information, 4 per sub pixel, for providing 4096 combinations of color and intensity in accordance with the presently preferred statistical detection of a complex image. In accordance with this preferred approach, the same input data is used within the integrity checking function 202 to articulate a subset of the image pixels. Generally, the probability of one point of light appearing to be correct by random, in the above example, is one in every 4096. One consideration in determining the number of samples required to be checked by the integrity checking function 202 in accordance with the present invention is the minimization of the probability of false error. For example, because the video graphics processor 206 performs anti-aliasing algorithms on the displayed image, there is no guarantee that a correct image can be determined with a high degree of confidence.

Assuming that there is a 30% probability that, due to anti-aliasing, a mismatch of a pixel value is detected, and that for a given image, there has to be three consecutive reports of a mismatch for it to be reported as failed, then in order to achieve a 1E-17 probability of false alarm, for a correct image to have a probability of 11 samples being mismatched three times in a row, the result would be $0.3^{(3\times11)}=0.56E-17$, which provides 11 as the number of acceptable mismatched samples. If, instead, 20 samples are chosen to be checked in the pattern in the above example, the probability of the video graphics processor 206 generating a mismatched pattern and randomly matching the correct samples as generated by the integrity checking function 202 would be $1/(4096^{20})$ which equals 0.57E-72. In this case, the probability of matching 9 correct numbers out of the 20 samples by chance would be $1/(4096^9)*20!/9!$, which equals 0.21E-19. This result can be considered as the probability of a mismatched pattern generated by the video graphics processor 206 going undetected by the integrity checking function 202. Based on the above example, a sample size of 20 with a 9 correct pass criteria will detect the correctness of the video graphics processor 206 generated image better than 1E-17 with a false alarm rate of better than 1E-17. Since the data refresh rate in the above example is 50 milliseconds or 72,000 times per hour, the probability of a false error or undetected error would be better than 1E-12 per hour based on a correct matching of 9 out of 20 points of light. The above example, in accordance with the present invention, demonstrates the reliability of error detection based on a small sample, size, and further demonstrates that in situations where, due to various filtering algorithms within the video graphics processor 206, detection of all the points is not possible, a larger number of samples can be utilized with a minimum correct pass criterion.

Summarizing the operation of the flat panel display system 10a of the present invention, the integrity checking function 202 receives aircraft data 214, keeps a copy of that data, and gives an identical copy to the graphics rendering function 204. The graphics rendering function 204 sends commands to the video graphics processor 206 so that the video graphics processor 206 generates an image in the display buffer located in memory 216. The graphics rendering function 204 sends the address of the frame buffer in which the video graphics processor 206 has completed rendering the current image to the integrity checking function 202. The integrity checking function 202, in turn, generates a subset of pixels for each image and, when both the integrity checking function 202 and the video graphics processor 206 are done generating their respective set of pixels, the integrity checking function 202 compares its pixels with the pixels the video graphics processor 206 has rendered into memory 216. If the pixels match the pixels drawn by the video graphics processor 206, then the integrity checking function 202 allows the video stream to continue to the display 208.

Figure 9:
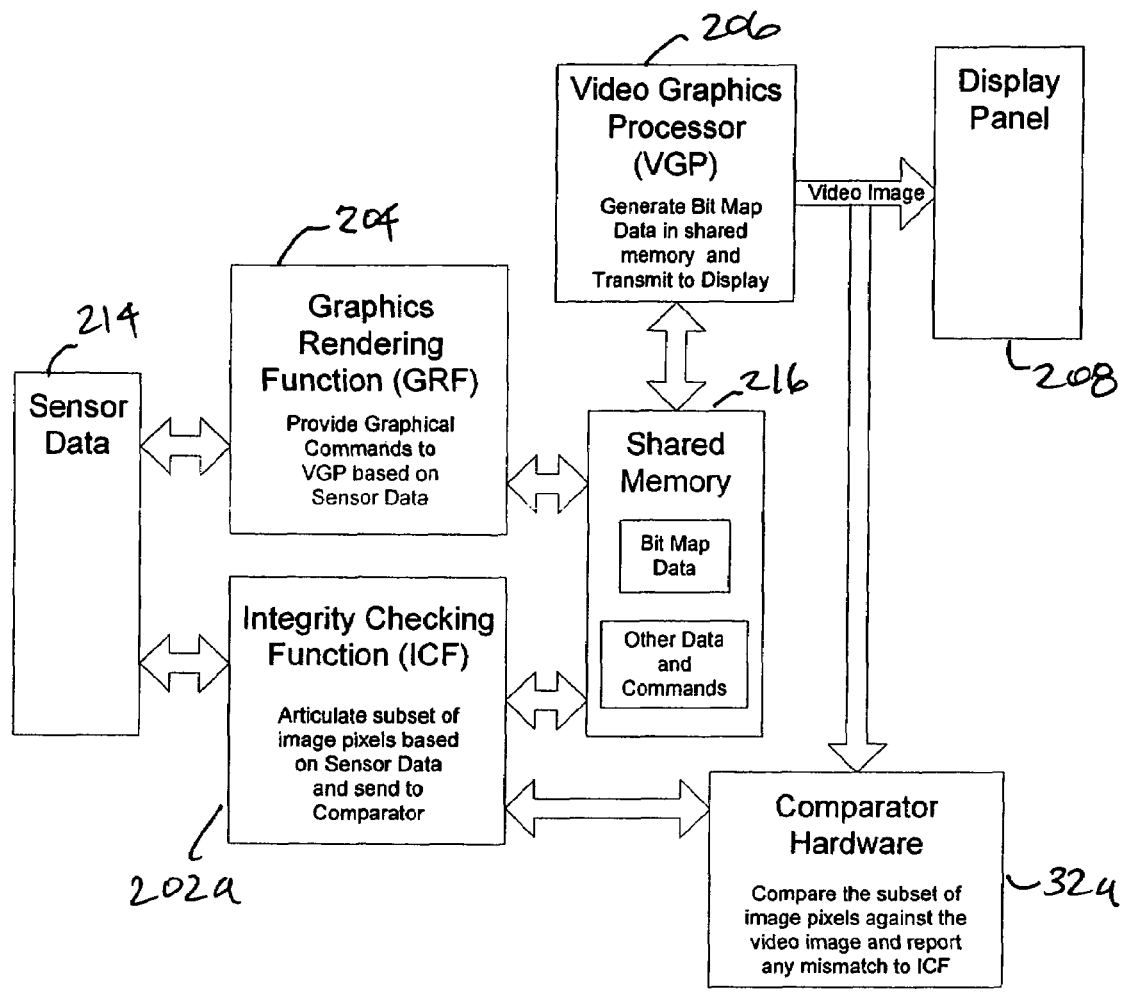
FIG. 9 is a functional block diagram, similar to FIG. 8, employing a hardware comparator.

As previously explained, FIG. 8 shows the presently preferred system 10 a of the present invention in which hardware comparator 32 has been omitted. FIG. 9, on the other hand, illustrates an alternative embodiment of the system 10a illustrated in FIG. 8, in which a hardware comparator 32a is included for comparing the subsets of image pixels sent to the comparator 32a from the integrity checking function 202a against the video image from the video graphics processor 206 for reporting any mismatch to the integrity checking function 202a. This approach is in contrast to the approach described with respect to FIG. 8 which does not employ a hardware comparator 32a. Otherwise, the various portions of the system are the same and like reference numerals are employed.

It should be noted, as described above with respect to FIGS. 1-6, conventional, commercially available general purpose computer system hardware may be employed for the various components of the system of the present invention.

What is claimed is:

1. In an aircraft instrument display system for imaging, on a bit-mapped display formed of a multiplicity of individually addressable pixels at locations throughout the bit-mapped display and actuatable to create images on the bit-mapped display, aircraft flight information based on a common set of aircraft and environmental sensor data that is entered via a display system input to the display system, said aircraft instrument display system including a video graphics processor;

the improvement comprising a common processor operatively connected between said video graphics processor and said display system input, said common processor incorporating means for providing both an integrity checking function and a graphics rendering function, said integrity checking function verifying proper functionality of said video graphics processor, said graphics rendering function using said common set of aircraft and environmental sensor data provided to said common processor for generating display output information for creating said bit-mapped display via said video graphics processor, said integrity checking function using said sensor data for generating a pixel verification map for said bit-mapped display, said pixel verification map comprising at least one check pixel, said graphics rendering function generating rendering calls to said video graphics processor, said video graphics processor generating said bit-mapped display as a graphical display of said aircraft flight information for use by flight crew of the aircraft in operating the aircraft, said integrity checking function using said pixel verification map for detecting a mismatch betweeen said check pixel of the pixel verification map against a corresponding rendered pixel of the multiplicity of individually addressable pixels of the bit-mapped display.

2. An improved aircraft instrument display system in accordance with claim 1 wherein said video graphics processor comprises a video memory for generating said display therefrom, said display comprising a plurality of display frames for providing a moving display, said video memory comprising means for multi-buffering said display frames for preventing tearing on said display when said display comprises said moving display.

3. An improved aircraft instrument display system in accordance with claim 1 wherein said video graphics processor comprises a video memory for generating said display therefrom, said graphics rendering function notifying said integrity checking function of a memory location in said video memory for a latest rendering call to said video graphics processor.

4. An improved aircraft instrument display system in accordance with claim 1 wherein said display is a color display and said check pixel is identified by an X and Y location on said display and a color associated with said check pixel.

5. An improved aircraft instrument display system in accordance with claim 1 wherein said video graphics processor comprises a video memory for generating said display therefrom, said integrity checking function comparing said check pixel using said pixel verification map against a corresponding pixel rendered by said video graphics processor in said video memory.

6. An improved aircraft instrument display system in accordance with claim 1 wherein said video graphics processor comprises means for generating anti-aliased graphical imaging data for creating said bit-mapped display.

7. An improved aircraft instrument display system in accordance with claim 1 wherein said display is a color display and said check pixel is identified by a color associated with said check pixel for verifying that information in said display has been drawn to a correct location in said display.

8. An improved aircraft instrument display system in accordance with claim 1 wherein said display is a color display having a background color different from the color of any objects displayed thereon in said display, said objects comprising at least one watermark thereon having a color close to said background color while appearing virtually identical to a human eye, said integrity checking function comprising means for detecting a difference in color between said watermark and said background.

9. An improved aircraft instrument display system in accordance with claim 8 wherein said background is an ADI background having a unique pattern thereon as said object, said unique pattern on said ADI background being utilized for checking for pitch and roll accuracy.

10. An improved aircraft instrument display system in accordance with claim 1 wherein said display comprises a plurality of successive frames, said pixel verification map comprising at least one check pixel in each of said successive frames.

11. An improved aircraft instrument display system in accordance with claim 10 wherein said display comprises a displayable image, said integrity checking function checking mismatch of a different point of said displayable image until all of said points on said displayable image are checked.

12. An improved aircraft instrument display system in accordance with claim 1 wherein said integrity checking function comprises means for enabling statistical detection of a complex image in said display for checking the integrity of said complex image.

13. An improved aircraft instrument display system in accordance with claim 12 wherein said statistical detection means comprises means for selecting a sufficient number subset of points of light in said display to assure a high probability of detecting misleading images with a low probability of false alarm.

14. An improved aircraft instrument display system in accordance with claim 13 wherein said complex image comprises an array of 1024 by 768 pixels with each pixel comprising three sub-pixels, said display comprising a displayable image, said system further comprising means for refreshing said display once every 50 milliseconds with a data stream comprising 4096 combinations of color and intensity.

15. An improved aircraft instrument display system in accordance with claim 13, wherein:

said means for enabling statistical detection is configured to:

track a report of mismatched pixels from a sample set of points of light;

track a specified number of consecutive reports of mismatched pixels in consecutive sample sets; and trigger alarms based on said consecutive reports of mismatched pixels without surpassing a specified false alarm rate.

16. An improved aircraft instrument display system in accordance with claim 12 wherein said complex image comprises a pixel array having a predetermined number of pixels, with each pixel in said array comprising a predetermined number of sub-pixels, said display comprising a displayable image, said display system further comprising means for refreshing said display with a data stream, said data stream comprising a predetermined number of combinations of color and intensity.

17. An improved aircraft instrument display system in accordance with claim 16 wherein said pixel array comprises 1024×768 pixels, with each pixel comprising three sub-pixels, said refreshing means refreshing said display once every 50 milliseconds with a data stream comprising 4096 combinations of color and intensity.

18. An improved aircraft instrument display system in accordance with claim 16 wherein said statistical detection means comprises means for selecting a sufficient number subset of points of light in said display to assure a high probability of detecting misleading images with a low probability of false alarm.

19. An improved aircraft instrument display system in accordance with claim 1 wherein said system further comprises a comparator processor for receiving the sensor data and generating from the received sensor data comparison imaging data for comparison by said comparator processor with selected parts of the graphics rendering function generated display output information for the plural flight parameters to thereby validate the display information that is generated by the graphics rendering function for the graphically rendering the flight information on the display, said comparison imaging data corresponding to the graphics function generated display information which is for use in actuating only said subset of said pixels for visibly imaging each of the flight parameters at a predetermined display location.

20. An improved aircraft instrument display system in accordance with claim 19 wherein said system further comprises an input/output processor for receiving and buffering the sensor data for transfer of the buffered sensor data to the graphics common processor and to the comparator processor.

21. An improved aircraft instrument display system in accordance with claim 20 wherein said system further comprises a data transfer bus connecting the graphics rendering processor, the comparator processor and the input/output processor.

22. An improved aircraft instrument display system in accordance with claim 19 wherein the comparison imaging data generated by the comparator processor is not anti-aliased, and wherein the comparator processor comprises means for comparing the not anti-aliased comparison imaging data to the corresponding graphics rendering common processor generated anti-aliased display information in a manner so as to enable, by said comparison, validation of the display information generated by said graphics rendering common processor.

23. A method for checking the integrity of a complex image in an aircraft instrument display system, wherein said aircraft instrument display system comprises a bit-mapped display formed of a multiplicity of individually addressable pixels at locations throughout the display, said aircraft instrument display system is actuatable to create images of aircraft flight information for use by flight crew of the aircraft in operating the aircraft, and said aircraft flight information being based on aircraft and environmental sensor data, said method comprising:
using a video graphics processor for generating said bit-mapped display from a video memory;
using a graphics rendering function of the aircraft instrument display system for notifying an integrity checking function about a memory location in said video memory for a latest rendering call to said video graphics processor; and
using statistical detection of said complex image for checking said integrity of said complex image,
wherein using said statistical detection comprises:
using said integrity checking function of the aircraft instrument display system for generating a pixel verification map for said bit-mapped display based on said sensor data, said pixel verification map comprising at least one check pixel; and
causing said integrity checking function to use said pixel verification map for detecting a mismatch between said check pixel of the pixel verification map against a corresponding rendered pixel of the of the multiplicity of individually addressable pixels of the bit-mapped display.

24. A method in accordance with claim 23 further comprising selecting a sufficient number subset of points of light in said display for assuring a high probability of detecting misleading images with a low probability of false alarm.

25. A method in accordance with claim 24 wherein said complex image comprises a pixel array having a predetermined number of pixels, with each pixel comprising a predetermined number of sub-pixels, said display comprising a displayable image, said method further comprising refreshing said display with a data stream comprising a predetermined number of combinations of color and intensity.

26. A method in accordance with claim 25 wherein said pixel array comprises an array of 1028×768 pixels, with each pixel comprising three sub-pixels, said refreshing step comprising refreshing said display once every 50 milliseconds with a data stream comprising 4096 combinations of color and intensity.

27. A method in accordance with claim 23 wherein said complex image comprises a pixel array having a predetermined number of pixels, with each pixel comprising a predetermined number of sub-pixels, said display comprising a displayable image, said method further comprising refreshing said display with a data stream comprising a predetermined number of combinations of color and intensity.

28. A method in accordance with claim 27 wherein said pixel array comprises an array of 1028×768 pixels, with each pixel comprising three sub-pixels, said refreshing step comprising refreshing said display once every 50 milliseconds with a data stream comprising 4096 combinations of color and intensity.

29. A method in accordance with claim 24, further comprising:
configuring said statistical detection to assure the high probability of detecting misleading images and the low probability of false alarm by:
tracking a report of mismatched pixels from a sample set of points of light; and
tracking a specified number of consecutive reports of mismatched pixels in consecutive sample sets.

30. A method in accordance with claim 23, further comprising:
generating for said bitmapped display a background color different from the color of any objects displayed thereon in said display;
generating for said objects at least one watermark thereon having a color close to said background color while appearing virtually identical to a human eye; and
providing for the integrity checking function a means for detecting a difference in color between said watermark and said background.

31. A method in accordance with claim 30 wherein:
the background is an ADI background; and
further comprising:

generating a unique pattern as one of said objects; and utilizing said unique pattern on said ADI background for checking pitch and roll accuracy.

32. A method in accordance with claim 23, further comprising:

rendering a plurality of successive frames for said bit-mapped display;

wherein said pixel verification map comprises at least one check pixel in each of said successive frames.

* * * * *